Patented Apr. 24, 1934

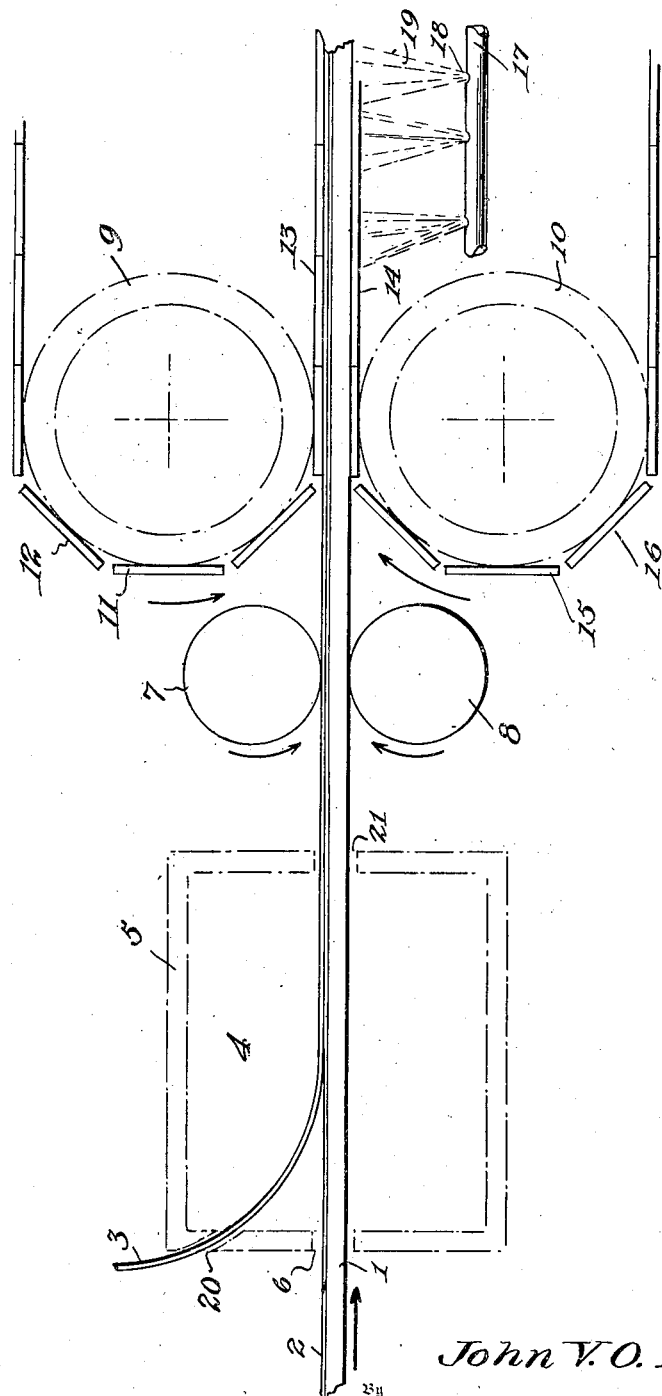

1,956,464

UNITED STATES PATENT OFFICE 1,956,464

BEARING MANUFACTURE

John V. O. Palm, Cleveland Heights, Ohio, assignor to The Cleveland Graphite Bronze Company, Cleveland, Ohio, a corporation of Ohio Application August 13, 1930, Serial No. 474,938

8 Claims. (Cl. 29—149.5)

This invention, relating, as indicated, to bearing manufacture, is more particularly directed to a novel method of producing journal bearings, as distinguished from ball and roller bearings.

Ordinarily, the housings which receive bearings are castings, and the bearing material which may be babbitt is poured against the housing, this process being quite costly because of the fact that the babbitt must be of considerable thickness due to the irregularity of the cast housing surface, and also because the housings are sometimes of relatively large proportions, and placing them in a position to line with babbitt is an expensive and awkward process. The thick layer of babbitt in such bearings of the prior art is also objectionable because babbitt is soft and a thick layer tears out more easily than a thin lining of babbitt backed with hard material.

A second well known method, which has supplanted to a large extent the above mentioned pouring method, in the bearing industry, is to line a thick layer of brass with babbitt, but the resulting bearing is very expensive because of the cost of the brass. It has been found that steel may be lined with babbitt or bronze, and that the thickness of the steel as compared with that of the brass may be materially reduced. The resulting bearing is very cheap to produce as far as the materials are concerned, but the problem heretofore unsolved is how to unite these two metals, which have such different properties, so that the cost of such union plus the cost of materials is less than the total cost of a lined housing or a lined brass backed bearing. I have found that either bronze, babbitt, or other suitable bearing material in the form of strips, may be united to steel, and that the thickness of the babbitt or equivalent bearing material, may be materially reduced and yet such a bearing will outlast a thick, cast, bearing, and in the event of replacement the cost is only a fraction of what it would be under former conditions.

A further and important objection to replacing worn out bearings by casting is that the process of casting, being carried out in small shops under all sorts of conditions, produces a bearing lining the structure of which is far from uniform as compared to a lining produced in the factory under controlled conditions, where the bearing has a structure of just the desired character. This will be appreciated by taking the main bearing of an automobile, for example, which is usually cast in the block. If this bearing becomes worn the block has to be taken out, all of the old babbitt removed, and then the bearing housing is cast with babbitt. With the use of my improved thin wall bearings all of this labor is avoided and the cost of material is less, since part of the space which was formerly occupied by babbitt, a very expensive material, is now taken up by steel. The reference to the use of my bearing in an automobile is only intended as a means of illustration and I do not wish to be limited to the use of my improved bearing on automobiles.

In this particular instance, I have aimed to overcome the difficulties which usually prevail when a strip of bearing backing material is joined to a strip of bearing facing material by means of an interposed strip of metalic adhesive material. I have found that this may be accomplished and very good results may be obtained by uniting a strip of bearing lining material such as babbitt, to a tin plated bearing backing material, such as steel, and that the plated steel in this instance is positively free from the danger of no bond between the tin and the steel. Consequently, only one joint has to be made and this joint is between two metals which readily unite under the proper conditions.

To the accomplishment of the foregoing and related ends, said invention, then, consists of the means hereinafter fully described and particularly pointed out in the claims; the annexed drawing and the following description setting forth in detail one method, one product and certain mechanism exemplifying my invention, such disclosed mechanism, procedure and product constituting, however, but one of various applications of the principle of my invention.

In said annexed drawing:—

The figure is a side elevation of part of the apparatus used in the manufacture of my improved bearing.

Referring now to the drawing, a strip of steel is shown at 1, having a tin plated upper surface 2, and this strip is passed through the opening 6 into a heat chamber 5. Directly above the opening 6 and in line therewith a second opening 20 is provided for the entrance of a suitable bearing material, such as babbitt or bronze, and this strip is led down and upon the tin plated surface 2. After the strips have been heated sufficiently they are passed between the feed rollers 7 and 9, which insure smooth travel of the strips and prevent any buckling or warping as it is highly important that the strips when pressed together remain in parallel planes. A pressure belt will be seen adjacent the feed rollers. It is believed sufficient to point out that the belt 13 consists of plates 11 and 12 held together by pin connected lugs (not shown) much in the same manner as the traction belt on a tractor. Movement of the belt is accomplished by means of sprockets, one of which is shown at 9. A similar belt 14 is subterposed directly beneath the upper belt and consists of plates 15 and 16, the whole belt revolving about two sprockets, one of which is shown at 10. A cooling means comprising a fluid supply pipe 17, having openings 18 from which a spray 19 is ejected, is provided for cooling the composite strip after it has been bonded together. The cooling means preferably is situated slightly further away from the sprocket 10 than shown, in order that the metal will have had time to be cooled slightly by the atmosphere, as it is believed impractical to cool the strip too soon after heating.

The method of forming bearings according to this invention is as follows:—

A tin plated strip of steel is passed into a heat chamber whereupon a strip of babbitt is superposed thereon and both of said strips are heated to a temperature at which the babbitt will unite with the tin, the strips then being pressed together under enormous pressure whereby a bond is obtained, after which the strip is cooled. The strip is then removed from the pressure mechanism, blanked to the desired size and formed into either whole or half round bearings.

From the above description it will be seen that it is only necessary to obtain a bond between two materials instead of three, and that these materials have inherent characteristics which enable them to be readily united. It will also be seen that less babbitt may be used and that the whole structure will always be of uniform, molecular constituency. A further advantage will be noted in that in the event of replacement my improved bearing may be used and that the cost of such replacement will be merely a fraction of what it was under old pouring methods.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. The method of manufacturing bearings, which consists in the steps of passing a strip of plated material through a heat chamber, superimposing a strip of bearing material upon said plated material in said heat chamber, bringing said strips to the same temperature, pressing said strips together between two oppositely disposed plane surfaces, blanking and then forming said blanks into bearings.

2. The method of manufacturing bearings, which consists in the steps of passing a strip of tin plated material through a heat chamber, superimposing a strip of bearing material upon said tin plated material in said heat chamber, bringing said strips to the same temperature, pressing said strips together between two oppositely disposed plane surfaces, blanking and then forming said blanks into bearings.

3. The method of manufacturing bearings, which consists in the steps of passing a strip of plated steel through a heat chamber, superimposing a strip of bearing material upon said plated steel in said heat chamber, bringing said strips to the same temperature, pressing said strips together between two oppositely disposed plane surfaces, blanking and then forming said blanks into bearings.

4. The method of manufacturing bearings, which consists in the steps of passing a strip of tin plated steel through a heat chamber, superimposing a strip of bearing material upon said tin plated steel in said heat chamber, bringing said strips to the same temperature, pressing said strips together between two oppositely disposed plane surfaces, blanking and then forming said blanks into bearings.

5. The method of manufacturing bearings, which consists in the steps of passing a strip of tin plated steel through a heat chamber, superimposing a strip of babbitt upon said tin plated steel in said heat chamber, bringing said strips to the same temperature, pressing said strips together between two oppositely disposed plane surfaces, blanking and then forming said blanks into bearings.

6. The method of manufacturing bearings, which consists in the steps of passing a strip of plated material through a heat chamber, superimposing a strip of bearing material upon said plated material in said heat chamber, bringing said strips to the same temperature, pressing said strips together between two oppositely disposed plane surfaces, blanking and then forming said blanks into bearings, said strips being cooled during said pressing operation.

7. The method of manufacturing bearings, which consists in the steps of passing a strip of tin plated steel through a heat chamber, superimposing a strip of babbitt upon said tin plated steel in said heat chamber, bringing said strips to the same temperature, pressing said strips together between two oppositely disposed plane surfaces, blanking and then forming said blanks into bearings, said strips being cooled during said pressing operation.

8. In the method of manufacturing bearings, the steps which comprise plating, as distinguished from merely passing through a bath, an initial coating of a relatively soft metal upon one surface of a strip of relatively hard backing metal, subsequently applying a coating of a second metal upon such plated surface, said plated surface and coating being brought to approximately the same temperature just prior to such coating application, said last named metal being different from said backing metal and said initially applied metal, and then blanking and forming such blanks into bearings.

JOHN V. O. PALM.